Dec. 24, 1929.    O. A. CHRISTENSEN    1,740,574
HOSE CONNECTION
Filed May 10, 1926
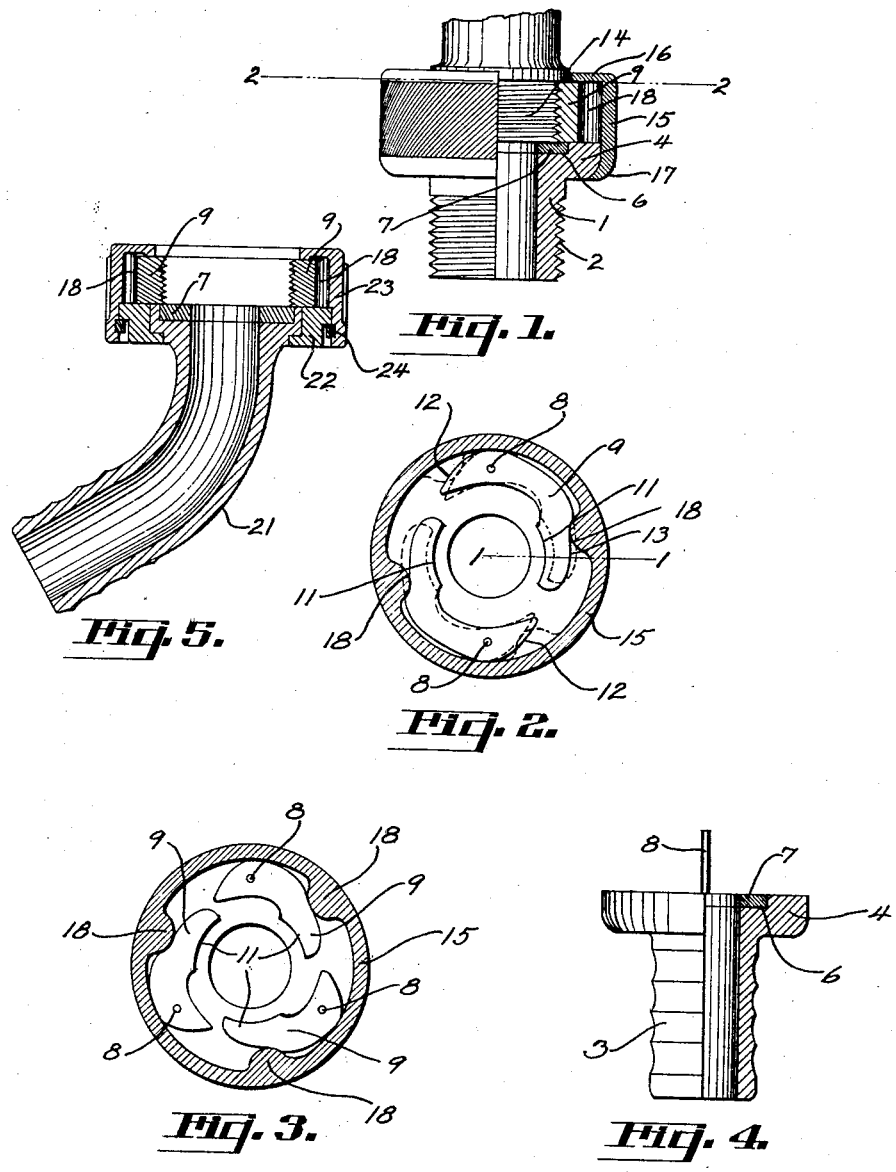
INVENTOR.
OSWALD A. CHRISTENSEN.
BY
ATTORNEYS.

Patented Dec. 24, 1929

1,740,574

UNITED STATES PATENT OFFICE

OSWALD A. CHRISTENSEN, OF OAKLAND, CALIFORNIA

HOSE CONNECTION

Application filed May 10, 1926. Serial No. 108,062.

The present invention relates to improvements in hose connections and has particular reference to a hose coupling which may be secured to the threaded end of a faucet by endwise motion without requiring any turning movement except through a small arc of a circle. It is particularly proposed in this invention to provide a coupling in which a plurality of threaded jaws are adapted to grip the threaded end of the faucet, and to be changed from gripping to non-gripping position and vice versa by a slight turning motion of an actuating element. Another important feature of the invention is to provide the actuating element with means for moving the jaws either to a gripping or a non-gripping position, as well as for limiting the movements of the jaws to the respective positions by the jaws' contact with such means, thus making special stop means superfluous and thereby simplifying the construction of the coupling. Further objects and advantages of my invention will appear as the specification proceeds.

The preferred forms of the invention are illustrated in the accompanying drawing in which Figure 1 shows one form partly in section, and partly in side elevation, Figure 2 a horizontal section taken along line 2—2 of Figure 1, Figure 3 a sectional view similar to that of Figure 2 of a slightly modified form, Figure 4 a detail view partly in side elevation and partly in section of a slightly different form of connecting element, and Figure 5 a vertical section through a modified form. While I have shown only the preferred forms of the invention, I wish to have it understood that various changes or modifications may be made within the scope of the claims hereto attached, without departing from the spirit of the invention.

My coupling comprises in its principal features, a sleeve 1 which may be threaded as shown at 2 for connection to a rigid threaded body or may be corrugated as shown at 3 in Figure 4 for connection to a flexible hose. The sleeve is provided with a flange 4 having a flat surface and providing a ledge 6 in which a washer 7 may be accommodated. A plurality of pins 8 of which two are shown in Figure 2, and three in Figure 3, rise from the upper face of the flange 4 and have the jaws 9 pivoted thereon. The jaws are provided with sectional threaded faces 11 pointing inwardly and with cam faces 12 and 13 presented outwardly on opposite sides of the pivot 8. The jaws are constructed in such a manner that when the threaded section of each jaw is radially retracted, all the jaws clear the thread 14 of a faucet, while when the threaded sectional faces of the jaws are forced inwardly they engage with the thread of the faucet for holding the coupling in place.

The jaws are operated by means of a ring 15 held in place by a flange 16 above the jaws and by a slight curvature 17 extending below the flange 4 of the sleeve 1. The ring is formed with internal projections 18 equal in number to that of the jaws and arranged to ride on confronting cam faces of adjacent jaws. It will be noted that in Figure 2 the projections have been forced in counter-clockwise direction as far as they will go and both projections have forced the threaded section of the jaws inwardly into engagement with the thread of a faucet. A slight turning movement of the ring in clockwise direction brings the projections 18 into a dotted line position shown in Figure 2 and causes them to ride on the confronting cam face of the adjacent jaw, whereby the threaded section of the latter is forced outwardly to clear the thread of the faucet as illustrated in dotted lines in Figure 2.

The arrangement shown in Figure 3 corresponds to that of Figure 2 with the only exception that three jaws are provided instead of two.

In Figure 5 the sleeve 21 is shown as being bent to lessen the stress on the hose attached thereto and in order to allow the hose to be freely swung about, the pin carrying section 22 is made as a separate part and revolvable on the sleeve. The ring 23 is held relative to the section 22 by means of a split ring 24 adapted to be sprung into a groove in the ring 23 and bearing on the underface of the section 22.

To use my coupling the same is first secured to a hose either by introducing the sleeve shown in Figure 4 into the flexible section of a hose or by threading the sleeve illustrated in Figure 1 into a suitable hose coupling. Holding the hose in his left hand, the operator turns the ring 15 clockwise into the dotted line position shown in Figure 2, and telescopes the entire device over the threaded section of the faucet until the end of the latter strikes the washer 7. A short turning motion of the ring in the opposite direction causes the threaded portions of the jaws to engage with the thread of the faucet and the turning motion may be continued if necessary to bring the washer 7 up against the bottom face of the faucet.

It will be seen that this entire operation requires very little time, it merely consisting of a short twist to the left, a slipping on, and a short twist to the right.

I claim:—

1. A coupling for engagement with a threaded faucet comprising a sleeve, a ring rotatable on the sleeve, spaced apart projections formed on the ring, jaws having inwardly turned faces at their respective ends, each of said jaws having an outwardly curved face contacting with the inner face of the ring and a pivot pin passing through each of the jaws concentrically with their outwardly curved faces.

2. A coupling for attachment to a threaded faucet comprising a sleeve, a ring rotatable on the sleeve, jaws pivotally related to the sleeve, projections carried by the ring and intermediate the jaws for moving the jaws into and out of engagement with the threads of the faucet by contact with the adjacent ends of the jaws, each projection contacting with the adjacent ends of each pair of adjacent jaws.

In testimony whereof I affix my signature.

OSWALD A. CHRISTENSEN.